US009335978B2

(12) United States Patent
Baudel et al.

(10) Patent No.: US 9,335,978 B2
(45) Date of Patent: *May 10, 2016

(54) COMPUTER AIDED VISUALIZATION OF A BUSINESS OBJECT MODEL LIFECYCLE

(71) Applicant: International Business Machines Corporation, Armonk, NY (US)

(72) Inventors: Thomas Baudel, Paris (FR); Nicolas Carre, Paris (FR)

(73) Assignee: International Business Machines Corporation, Armonk, NY (US)

(*) Notice: Subject to any disclaimer, the term of this patent is extended or adjusted under 35 U.S.C. 154(b) by 47 days.

This patent is subject to a terminal disclaimer.

(21) Appl. No.: 14/474,234

(22) Filed: Sep. 1, 2014

(65) Prior Publication Data

US 2014/0372969 A1 Dec. 18, 2014

Related U.S. Application Data

(63) Continuation of application No. 13/156,139, filed on Jun. 8, 2011, now Pat. No. 8,826,227.

(51) Int. Cl.
*G06F 17/30* (2006.01)
*G06F 9/44* (2006.01)

(52) U.S. Cl.
CPC ... *G06F 8/34* (2013.01); *G06F 8/33* (2013.01)

(58) Field of Classification Search
CPC .............. G06Q 10/06; G06F 17/30592; G06F 17/30306; G06F 9/5038; G06F 9/542; G06F 2209/5011; G06F 2209/5018; G06F 8/34; G06F 8/33; G06F 9/5055
See application file for complete search history.

(56) References Cited

U.S. PATENT DOCUMENTS

| | | | | |
|---|---|---|---|---|
| 7,020,869 | B2* | 3/2006 | Abrari | G06F 8/10 706/47 |
| 7,283,986 | B2* | 10/2007 | Okunseinde | G06F 11/3684 |
| 7,386,857 | B2* | 6/2008 | Das | G06F 9/5055 709/208 |
| 7,475,080 | B2* | 1/2009 | Chowdbary | G06F 17/30607 |
| 7,788,238 | B2 | 8/2010 | Gabriel et al. | |
| 7,953,722 | B2* | 5/2011 | Tatzel | G06F 17/30477 707/706 |
| 8,024,305 | B2* | 9/2011 | Chowdhary | G06F 17/30306 707/695 |
| 8,584,144 | B2* | 11/2013 | Barker | G06F 9/5038 719/318 |
| 8,893,031 | B2* | 11/2014 | Kornmann | G06Q 10/00 707/802 |
| 2002/0188583 | A1* | 12/2002 | Rukavina | G09B 7/00 706/45 |
| 2006/0241954 | A1* | 10/2006 | Jeng | G06Q 10/103 706/47 |
| 2007/0067254 | A1* | 3/2007 | Chen | G06Q 10/10 |
| 2007/0282692 | A1* | 12/2007 | Bishop | G06Q 10/06 705/26.1 |

OTHER PUBLICATIONS

Murta et al., Towards odyssey—VCS 2: improvements over a UML-based version control system, May 2008, 6 pages.*
C. Pichler, A framework for handling variants of software models, Apr. 2010, 2 pages.*
Zulkernine et al., A Constraint-Driven Business Object Model for Service-Based Business Processes, 2012, 7 pages.*

* cited by examiner

*Primary Examiner* — Thuy Dao
(74) *Attorney, Agent, or Firm* — Steven M. Greenberg, Esq.; CRGO Law

(57) ABSTRACT

A method, system and apparatus for visualization of versions of a BOM (business object model) is provided. In accordance with an embodiment of the invention, data from at least two different BOMs can be extracted to create a flat table, where the flat table includes all versions of each of the different BOMs. A hierarchy of nodes can then be generated from the flat table. Additionally, a root node and a hierarchy of descendants based upon the hierarchy of nodes using a tree map can be displayed in a graphical user interface of a computer.

18 Claims, 3 Drawing Sheets

FIG. 4

COMPUTER AIDED VISUALIZATION OF A BUSINESS OBJECT MODEL LIFECYCLE

CROSS-REFERENCE TO RELATED APPLICATION

This application is a Continuation of U.S. application Ser. No. 13/156,139, filed Jun. 8, 2011, now U.S. Pat. No. 8,826,227, which is incorporated herein by reference in their entirety.

BACKGROUND OF THE INVENTION

1. Field of the Invention

The present invention relates to visualization of changes in source code in an integrated development environment (IDE) and more particularly to visualization of changes in a business object model in an object modeler.

2. Description of the Related Art

Software development has evolved from the primitive specification of program code on punch cards to a source code file driven compilation and build workflow. Early, simplistic software development projects involved a single developer coding to a specification on a single development computer using a text editor to access a source code file and separate compile and build programs processing the source code file into an executable binary. As the complexity of the computer program grew in parallel to the growth of computing power, software development evolved into a multi-developer endeavor requiring sophisticated source code management and debugging tools to corral and coordinate the efforts of the developers.

Principal to the modern software development workflow is the integrated development environment (IDE). Initially introduced as the primary user interface to a particular coding language such as the venerable PASCAL or ubiquitous C++ and Java programming languages, the IDE has morphed into its own stand-alone computing product and now, is more akin to a high end word processor coupled to a document management enterprise system rather than a user interface to a hodge-podge of coding and debugging tools.

Object modeling performs a complimentary function to software development. In this regard, object-oriented analysis and design (OOAD) is a software engineering approach that models a system as a group of interacting objects. Each object represents some entity of interest in the system being modeled, and is characterized by its class, its state (data elements), and its behavior. Various models can be created to show the static structure, dynamic behavior, and run-time deployment of these collaborating objects. Business Object Models (BOMs) are abstract data models (i.e. sets of packages, classes, class members and properties of the classes) meant to adapt an enterprise data model to the specific needs of a business application and business users. Those data models are abstract in the sense they have no concrete implementation by themselves. Rather, the rely on translations techniques to transform raw enterprise data structures represented in various formats into a form suitable for the end user, and translating back the end user's actions on the entities presented into updates to the low level enterprise data structures.

Versioning and managing such kinds of large object models like BOMs raises a number of issues. First, the object model is often designed and maintained by a different team than the teams who manages the applications that use the object model. Many independent applications may thus rely on the same BOM. The life cycle of a BOM tends to be longer than the applications that use the BOM. The BOM strongly relies on the information systems of the enterprise, but authorizes some decoupling to make writing rules easier and closer to the business users. As a result, BOMs are strongly coupled to both the underlying external model they represent and to the high level application (such as a set of production rules using this model). This means that when the underlying data structures are modified, some local changes must be performed on the BOM and its translation properties to maintain the consistency of the application rules that use it.

Such changes are very difficult to automate, as they mostly require contextual decisions to be made about each change. For instance, the addition or removal of a member may make some business logic obsolete, ambiguous, or even contradictory. Hence, changes to an external object model may require more than simply propagating the changes to the BOM. It may mean rewriting part of the business logic that sits on top of it. For this reason, common design guidelines recommend that the BOM definitions be cast in stone at the beginning of application development, and the golden rule is to update the BOM only when absolutely necessary and with careful control of all the implications of the changes performed.

At present, analysis and management of BOMs is done essentially with textual tools—namely text editors, textual search (sometimes with autocompletion), and some general purpose visual tools such as visual differentiators within a versioning system. The issue with these types of analysis tools is that they provide little overview information, and make it difficult to relate dependant parts of the BOM to each other. In this regard, given the vast nature of a BOM model, comparing two versions of the same BOM in a versioning user interface can be impossible to exploit as both BOMs appear to be completely different.

BRIEF SUMMARY OF THE INVENTION

Embodiments of the present invention address deficiencies of the art in respect to versioning of a BOM and provide a novel and non-obvious method, system and computer program product for visualization of versions of a BOM. In an embodiment of the invention, a method for visualizing versions of a business object model (BOM) is provided. The method includes extracting data from at least two different BOMs into a single table of a plurality of rows, each of the rows comprising a class name for a corresponding class in a corresponding one of the versions, an indication of the corresponding one of the versions, and at least one other characteristic of the corresponding class, generating a tree map from the single table based upon at least two columns of the rows of the single table and displaying the tree map in a user interface to a versioning data processing system executing in memory of a computer.

In another embodiment, the method can further include receiving a modification to a cell in the tree map, applying the modification to a corresponding row and column of the single table and further applying the modification to a portion of a version of the BOM corresponding to the row and column of the single table.

In yet another embodiment, a versioning processing data system configured for visualizing versions of a business object model (BOM), which includes a computer with at least one processor and memory, a modeling tool executing in the computer and a visualization manager executing in the memory of the computer, the visualization manager comprising program code enabled to extract data from at least two different BOMs into a single table of a plurality of rows, each of the rows comprising a class name for a corresponding class in a corresponding one of the versions, an indication of the corresponding one of the versions, and at least one other characteristic of the corresponding class, to generate a tree map from the single table based upon at least two columns of the rows of the single table, and to display the tree map in a user interface to a versioning data processing system executing in memory of a computer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for visualization of versions of a BOM. In accordance with an embodiment of the invention, two or more different versions of a BOM can be loaded into a versioning data processing system of a modeling tool executing in memory of a computer. The data from both versions of the BOM can be loaded into a single table in which each row of the table can include columns for a class name of a corresponding class specified by one of the versions of the BOM, a version of the corresponding class and at least one characteristic of the corresponding class such as a member name, type, date, argument, or other annotations such as vocabulary, comments, date. Subsequently, the single table can be visualized in at least two different treemaps for at least two different attributes of the versions of the BOM set forth in the single table. Optionally, the records of the single table can be modified directly within the treemap and changes applied to cells of the treemap can be applied to the single table and then to a corresponding one of the versions of the BOM. In this way, two or more versions of the same BOM can be compared in a versioning user interface.

Figure 1:
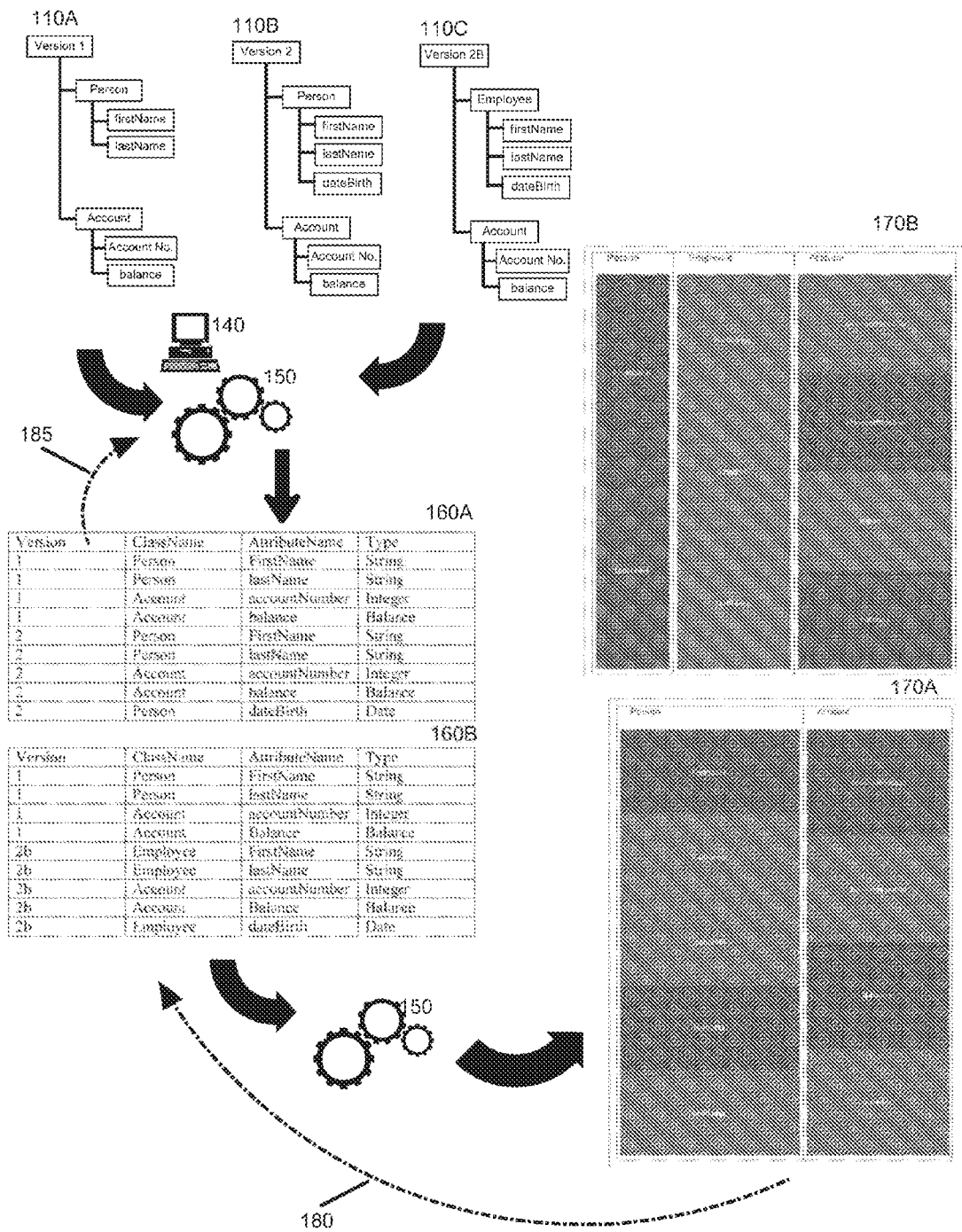
FIG. 1 is a pictorial illustration of a process for visualization of versions of a BOM.

In further illustration, FIG. 1 pictorially depicts a process for visualization of versions of a BOM. As shown in FIG. 1, a visualization manager 150 can execute on a computer 140 to generate a versioning interface of tree maps 170A and 170B. Visualization manager 150 extracts data for two different BOMs, e.g., 110A, 110B and/or 110C, to create a flat table 160A and/or 160B of all the various versions of object models. For example, table 160A is a comparison of version 1 (110A) and version 2 (110B) of an object model. In this example, visualization manager 150 can execute the following algorithm to generate the flat tables 160A and 160B.

```
1   Create an Empty Table t
2   For all versions v of the object model
3       For all classes c in version v
4           For all attributes a in class c
5               Add a row r to t
6               Set column "Version" of row r of table t
                to v's version name
7               Set column "ClassName" of row r of table t
                to c's classname
8               For all properties p of attribute a
9                   Set column 'p's name' of row r of table t to
                    the value of property p.
10  End
```

Using the visualization manager 150 to apply the flat table algorithm to objects 110A and 110B generates table 160A. Similarly, applying the flat table algorithm to objects 110A and 110C generates table 160C.

Now the visualization manager 150 can be used to generate a hierarchy of nodes referencing the classes and sub nodes referencing individual attributes in the models. For example, visualization manager 150 can execute the following algorithm to generate a hierarchy of nodes referencing the classes and sub nodes referencing individual attributes in the models.

```
1   Sort table t by ClassName, then by Attribute
2   initialize variable "current class" to ""
3   initialize variable "current node" to null.
4   create a root node rn.
5   for all rows r in t
6       if the class in r is not equal to "current class"
7           add "current node" to rn
8           Set "current node to a new empty node.
9       else add a child node referencing r to node "current node".
10  end
```

Next, visualization manager 150 can use a common treemap to display the root node "rn" and its hierarchy of descendants as shown in 170A and 170B. The user interface can display the object model by ClassName/AttributeName and shading by version (e.g., darker shading is version 1, lighter shading is version 2 in first diagram and in the second diagram, lighter shading is version 2b). In embodiments, color by version can be included. For example in treemaps 170A and 170B, the color red could be used to indicate version 1, while the color blue could be used to indicate version 2 in the first diagram 170A, and in the second diagram 170B, the color blue is version 2b.

Alternatively, in another embodiment, the visualization manager 150 can use the same common treemap to display another hierarchy extracted from the same table 160B by using a variation of the previous algorithm as shown below.

```
1   Sort table t by AttrbuteName, then by ClassName
2   initialize variable "current attribute" to ""
3   initialize variable "current node" to null.
4   create a root node rn.
5   for all rows r in t
6       if the AttributeName in r is not equal to "current attribute"
7           add "current node" to rn
8           Set "current node to a new empty node.
9       else add a child node referencing r to node "current node".
10  end
```

Figure 4:
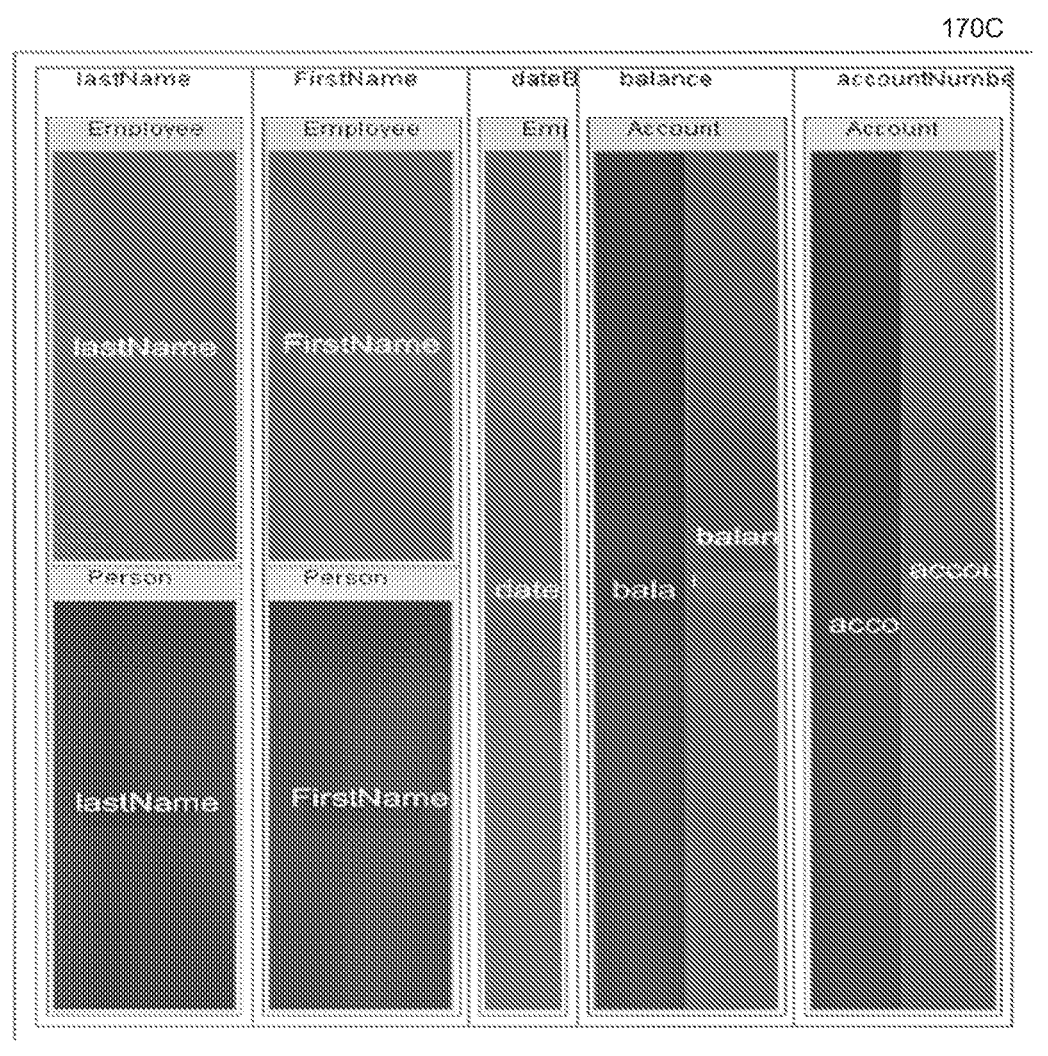

As illustrated by the treemap 170C of FIG. 4, the user interface can display the object model by AttributeName, then ClassName and shading by version (e.g., darker shading is version 1, lighter shading is version 2 in FIG. 4). In embodiments, color by version can be included. For example in treemap representation 170C, the color red could be used to indicate version 1, while the color blue could be used to indicate version 2b. As indicated in the representation 170C, a user can spot immediately that the attribute balance in the in the class Account remains unchanged, while the attributes "FirstName" and "lastName" appear in the class "Person" in the old model (darker shading), and the class Employee appears in the new model (lighter shading). This result strongly suggests that the class Person has been renamed Employee.

Figure 2:
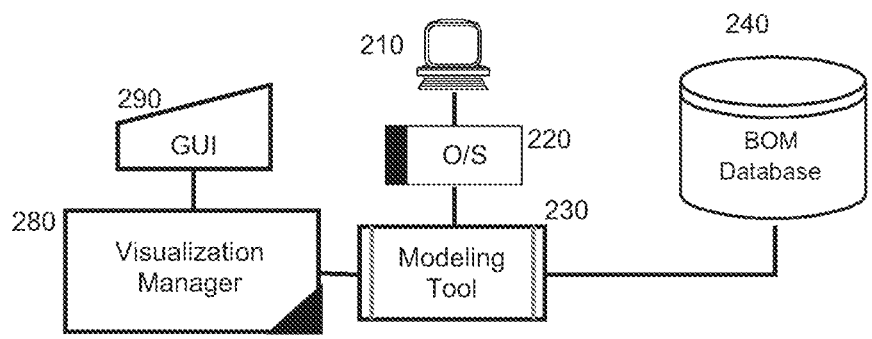
FIG. 2 is a schematic illustration of a modeling data processing system configured for visualization of versions of a BOM.

The process described in connection with FIG. 1 can be implemented in a modeling data processing system. In this regard, FIG. 2 is a schematic illustration of a modeling data processing system configured for visualization of versions of a BOM. The system can include a host computer 210 with at least one processor and memory. The host computer 210 can be configured for communicative coupling to modeling tool 230 and visualization manager 280.

The host computer 210 can include an operating system 220 executing by one or more of the processors in the memory of the host computer 210. A modeling tool 230, in turn, can be hosted by the operating system 220. The modeling tool 230 can include functionality sufficient to acquire data from business object model (BOM) and store them in a database, such as the BOM database 240. Notably, a visualization manager 280 can be coupled to the modeling tool 230 and can execute in the memory by one or more of the processors of the host computer 210. The visualization manager 280 can include program code enabled to display in a GUI 290 BOMs 110 and tree maps 170. The visualization manager 280 further can include program code enabled to extract data from two different BOMs into a single table of a plurality of rows, each of the rows including a class name for a corresponding class in a corresponding one of the versions, an indication of the corresponding one of the versions, and at least one other characteristic of the corresponding class. The manager 280 yet further can include program code enabled to generate a tree map from the single table based upon at least two columns of the rows of the single table and display the tree map in a user interface to a versioning data processing system executing in memory of computer 210.

The manager 280 yet further can include program code enabled to receive a modification to a cell in the tree map, to apply the modification to a corresponding row and column of the single table and further to apply modification to a portion of a version of the BOM corresponding to the row and column of the single table.

Figure 3:
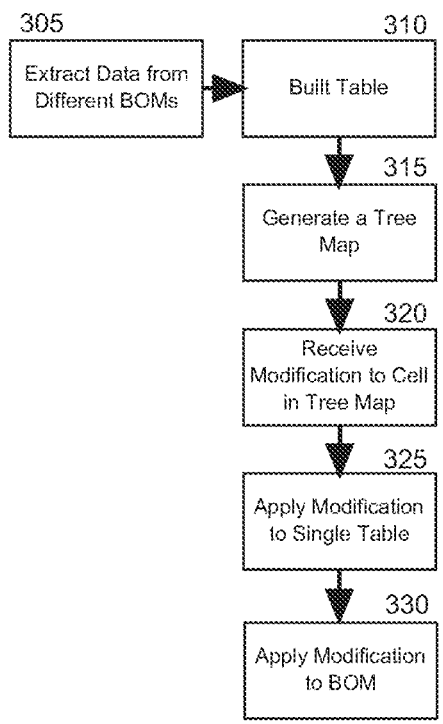
FIG. 3 is a flow chart illustrating a process for visualization of versions of a BOM; and, FIG. 4 is a treemap representation of an object model by Attribute name, class name and version.

In even yet further illustration of the operation of visualization manager 280, FIG. 3 is a flow chart illustrating a process for visualization of versions of a BOM. Beginning in block 305, data from different BOMs (e.g., different versions of a BOM) can be extracted and in block 310, a table can be generated or built to provide a "flattened" table. In block 315, a tree map can be generated for the flat table. In block 320, a modification to a cell in the generated tree map can be received. Thereafter, in block 325, the modification can be applied to the corresponding row and column of the single table 160A, 160B (as shown by arrow 180) and in block 330, the modification can be applied to a portion of a version of the BOM 110A-C, corresponding to the row and column of the single table.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of visualizing versions of a business object model (BOM), comprising:
    extracting, by a processor of a computer, data from at least two different BOMs to create a flat table, the flat table including all versions of each of the different BOMs;
    generating a hierarchy of nodes from the flat table;
    displaying, in a graphical user interface on the computer, a root node and a hierarchy of descendants based upon the hierarchy of nodes using a tree map.

2. The method of claim 1, wherein creating the flat table further comprises applying an algorithm to each of the different BOMs.

3. The method of claim 1, wherein generating the hierarchy of nodes comprises applying an algorithm to the hierarchy of nodes.

4. The method of claim 1, wherein the hierarchy of nodes reference a plurality of classes and a plurality of sub nodes, the plurality of classes and the plurality of sub nodes referencing individual attributes in each of the different BOMs.

5. The method of claim 1, wherein displaying the root node and the hierarchy of descendants further comprises shading by version, so that a version of a BOM is shaded differently than a different version of the BOM.

6. The method of claim 1, wherein displaying the root node and the hierarchy of descendants further comprises coloring by version, so that a version of a BOM is colored differently than a different version of the BOM.

7. A computer program product for visualizing versions of a business object model (BOM), the computer program product comprising:
    a non-transitory computer readable storage medium having computer readable program code embodied therewith, the computer readable program code comprising:
    computer readable program code for extracting data from at least two different BOMs to create a flat table, the flat table including all versions of each of the different BOMs;
    computer readable program code for generating a hierarchy of nodes from the flat table;
    computer readable program code for displaying, in a graphical user interface on a computer, a root node and a hierarchy of descendants based upon the hierarchy of nodes using a tree map.

8. The computer program product of claim 7, wherein the computer readable program code for creating the flat table further comprises computer readable program code for applying an algorithm to each of the different BOMs.

9. The computer program product of claim 7, wherein the computer readable program code for generating the hierarchy of nodes comprises computer readable program code for applying an algorithm to the hierarchy of nodes.

10. The computer program product of claim 7, wherein the hierarchy of nodes reference a plurality of classes and a plurality of sub nodes, the plurality of classes and the plurality of sub nodes referencing individual attributes in each of the different BOMs.

11. The computer program product of claim 7, wherein the computer readable program code for displaying the root node and the hierarchy of descendants further comprises computer readable program code for shading by version, so that a version of a BOM is shaded differently than a different version of the BOM.

12. The computer program product of claim 7, wherein the computer readable program code for displaying the root node and the hierarchy of descendants further comprises computer readable program code for coloring by version, so that a version of a BOM is colored differently than a different version of the BOM.

13. A versioning data processing system configured for visualizing versions of a business object model (BOM), the system comprising:
 a computer with at least one processor and memory;
 a modeling tool executing in the computer; and,
 a visualization manager executing in the memory of the computer, the visualization manager comprising program code enabled to extract data from at least two different BOMs to create a flat table, the flat table including all versions of each of the different BOMs, to generate a hierarchy of nodes from the flat table, and to display, in a graphical user interface on the computer, a root node and a hierarchy of descendants based upon the hierarchy of nodes using a tree map.

14. The system of claim 13, wherein the program code of the visualization manager enabled to create the flat table further comprises applying an algorithm to each of the different BOMs.

15. The system of claim 13, wherein the program code of the visualization manager enabled to generate the hierarchy of nodes comprises applying an algorithm to the hierarchy of nodes.

16. The system of claim 13, wherein the hierarchy of nodes reference a plurality of classes and a plurality of sub nodes, the plurality of classes and the plurality of sub nodes referencing individual attributes in each of the different BOMs.

17. The system of claim 13, wherein the program code of the visualization manager enabled to display the root node and the hierarchy of descendants further comprises shading by version, so that a version of a BOM is shaded differently than a different version of the BOM.

18. The system of claim 13, wherein the program code of the visualization manager enabled to display the root node and the hierarchy of descendants further comprises coloring by version, so that a version of a BOM is colored differently than a different version of the BOM.

* * * * *